US012111891B2

(12) United States Patent
Lewis et al.

(10) Patent No.: US 12,111,891 B2
(45) Date of Patent: Oct. 8, 2024

(54) DRM SHARING AND PLAYBACK SERVICE SPECIFICATION SELECTION

(71) Applicant: Google LLC, Mountain View, CA (US)

(72) Inventors: Justin Lewis, Mountain View, CA (US); Richard Dominick Rapp, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 487 days.

(21) Appl. No.: 16/322,474

(22) PCT Filed: Oct. 27, 2016

(86) PCT No.: PCT/US2016/059016
§ 371 (c)(1),
(2) Date: Jan. 31, 2019

(87) PCT Pub. No.: WO2018/080491
PCT Pub. Date: May 3, 2018

(65) Prior Publication Data
US 2021/0374211 A1    Dec. 2, 2021

(51) Int. Cl.
*G06F 21/10* (2013.01)
*H04N 21/254* (2011.01)

(52) U.S. Cl.
CPC ......... *G06F 21/10* (2013.01); *H04N 21/2541* (2013.01); *H04L 2463/101* (2013.01)

(58) Field of Classification Search
CPC ............... G06F 21/10; H04L 2463/101; H04L 2209/603; H04L 2209/60; H04L 2209/605;
(Continued)

(56) References Cited

U.S. PATENT DOCUMENTS 7,779,482 B1 * 8/2010 Yen ........................ H04L 9/3226
726/30
8,468,608 B1 * 6/2013 Hernacki ................ G06F 21/10
726/1
(Continued)

FOREIGN PATENT DOCUMENTS

CN    1949238 A    4/2007
CN   105684384 A    6/2016
(Continued)

OTHER PUBLICATIONS

PCT International Prelim. Report on Patentability and Written Opinion dated May 9, 2019 in International Application No. PCT/US2016/059016.
(Continued)

*Primary Examiner* — Jeremy S Duffield
(74) *Attorney, Agent, or Firm* — MARSHALL, GERSTEIN & BORUN LLP

(57) ABSTRACT

Systems and methods for optionally restricting the rendering of particular content items. An example method comprising: receiving a plurality of content rendering options supported by a client device; determining a content item to be rendered, the content item being associated with a restriction attribute; selecting a content rendering option supported by the client device in view of the restriction attribute; generating a token comprising data associated with the selected content rendering option and the content item; receiving a client request from the client device, wherein the client request is associated with the content item and indicates a chosen content rendering option; comparing the data of the token with the chosen content rendering option indicated by the client request to determine a match; and granting the client device access to perform the chosen content rendering (Continued)

option on the content item based on the outcome of the determination of the match.

20 Claims, 4 Drawing Sheets

(58) Field of Classification Search
CPC .. H04L 65/60; H04N 21/2541; H04N 21/482; H04N 21/472; H04N 21/47202
See application file for complete search history.

(56) References Cited

U.S. PATENT DOCUMENTS

| | | | | |
|---|---|---|---|---|
| 8,719,586 | B1* | 5/2014 | Paleja | G06F 21/33 |
| | | | | 726/20 |
| 8,862,517 | B2* | 10/2014 | Padhye | G11B 20/0021 |
| | | | | 380/277 |
| 9,129,095 | B1* | 9/2015 | Lam | H04L 63/123 |
| 9,501,582 | B2* | 11/2016 | Bhise | G06F 40/143 |
| 2008/0313302 | A1* | 12/2008 | Heyworth | G06F 16/40 |
| | | | | 709/217 |
| 2010/0022270 | A1* | 1/2010 | Mikkelsen | G06Q 30/06 |
| | | | | 235/462.01 |
| 2010/0031299 | A1* | 2/2010 | Harrang | H04N 21/4363 |
| | | | | 725/80 |
| 2010/0191974 | A1* | 7/2010 | Dubhashi | G06F 21/10 |
| | | | | 713/176 |
| 2010/0299522 | A1* | 11/2010 | Khambete | H04L 63/061 |
| | | | | 713/168 |
| 2012/0324552 | A1* | 12/2012 | Padala | H04L 9/3213 |
| | | | | 726/6 |
| 2014/0101722 | A1* | 4/2014 | Moore | H04L 63/0428 |
| | | | | 726/4 |
| 2015/0013006 | A1* | 1/2015 | Shulman | H04L 63/1416 |
| | | | | 726/23 |
| 2015/0040022 | A1* | 2/2015 | Pippuri | H04L 67/56 |
| | | | | 715/739 |
| 2015/0242597 | A1 | 8/2015 | Danciu | |

FOREIGN PATENT DOCUMENTS

| | | |
|---|---|---|
| CN | 106030509 A | 10/2016 |
| EP | 2 999 230 | 3/2016 |

OTHER PUBLICATIONS

Examination Report for EP Appln. Ser. No. 16795191.2 dated Dec. 4, 2020 (5 pages).

First Office Action for Chinese Application No. 201680088881.4, dated Nov. 18, 2022.

* cited by examiner

DRM SHARING AND PLAYBACK SERVICE SPECIFICATION SELECTION

RELATED APPLICATIONS

The present application claims the benefit of and priority to P.C.T. Application No. PCT/US2016/059016, filed Oct. 27, 2016, entitled, "DRM Sharing and Playback Service Specification Selection," the entirety of which is incorporated by reference herein.

TECHNICAL FIELD

The disclosure relates to techniques for providing content, such as media from a source of such content to a client device or system requesting such content via a communication network. More particularly, the present disclosure relates to a technique for ensuring that content, which may include audio and/or video content is provided to an application or player on a client device for display or further use when the said application is authorized to receive such content.

BACKGROUND AND TECHNICAL PROBLEMS IN EXISTING SYSTEMS

Existing systems for provision of media content from a server to one or more client devices generally takes place using a protocol for streaming such content from the server to a playback means (i.e., a video and/or audio player) on the client device, as long as such player is capable of receiving such content for display on the device. On typical client devices, a plurality of such application or players may be available to receive and use/play such content. In existing systems, it is not possible to ensure that a particular application or player is used for a particular media content. This may be because existing techniques rely on the settings of the players or applications that are available on the client device with no means to remotely check or validate that the content is provided to the player or application that is authorized to display or share such content.

SUMMARY

The following is a simplified summary of the disclosure in order to provide a basic understanding of some aspects of the disclosure. This summary is not an extensive overview of the disclosure. It is intended to neither identify key or critical elements of the disclosure nor delineate any scope of the particular embodiments of the disclosure or any scope of the claims. Its sole purpose is to present some concepts of the disclosure in a simplified form as a prelude to the more detailed description that is presented later.

In one implementation, a method for optionally restricting content provided to a client device is disclosed. The method may include receiving a plurality of content rendering options supported by a client device, determining a content item to be rendered, the content item being associated with a restriction attribute, selecting a content rendering option from the plurality of content rendering options supported by the client device in view of the restriction attribute, generating a token comprising data associated with the selected content rendering option and the content item, receiving a client request from the client device, wherein the client request is associated with the content item and indicates a chosen content rendering option, comparing the data of the token with the chosen content rendering option indicated by the client request to determine a match, and granting the client device access to perform the chosen content rendering option on the content item based on the outcome of the determination of the match. In one example, the restriction attribute associated with the content item is provided by a creator of the content item and the restriction attribute indicates whether the content item corresponds to a content rendering option that supports digital rights management (DRM) or a rendering option that is free of DRM In another implementation, the method further includes querying the client device for the content rendering options supported by the client device and receiving the plurality of content rendering options from the client device. The selection of one of the content rendering option may involve identifying the content rendering option from the plurality of content rendering options based on a user experience of the content rendering option exceeding a predetermined threshold. The selected content rendering option may correspond to a sharing application on the client device or to a particular media player on the client device that performs the content rendering option. In one example, the selected content rendering option comprises remotely rendering the content item using one or more sharing services available to the client device. In another example, the selected content rendering option comprises playback or display of the content item.

In yet another implementation, the method may also involve transmitting the token to the client device and subsequently receiving the token with the client request. The token may be generated by encoding the data associated with the selected content rendering option and the content item using a binary-to-text function. The token and a specification may be transmitted to the client device prior to receiving the client request. The specification may indicate the content item an d the selected content rendering option to the client device. The method may also involve authenticating the token received from the client device and validating the client request in view of the token received from the client device.

In another implementation, the method may also involve granting the client device access by providing the content item to a rendering component on the client device that implements the selected content rendering option, wherein the rendering component is at least one of a native media player, a browser media player, or a plugin media player. In one example, determining the content item may involve identifying a content item in view of a content identifier received from the client device. In another example, determining the content item may involve selecting the content item from a plurality of content items after filtering out one or more content items that are not supported by at 1 east one of the plurality of content rendering options of the client device.

In additional implementations, computing devices for performing the operations of the above described implementations are also disclosed.

In some implementations, a computer readable storage media stores instructions for causing a processing device to perform the operations of the above described implementations.

BRIEF DESCRIPTION OF THE DRAWINGS

The present disclosure is illustrated by way of example, and not by way of limitation, in the figures of the accompanying drawings.

These drawings may be better understood when observed in connection with the following Detailed Description.

DETAILED DESCRIPTION

Aspects of the present disclosure provide techniques for ensuring that special requirements relating to security of the content or otherwise are in the first instance identified by the server for a respective content that the server is to send to the client device. The applications or rendering options available at the respective client device is identified by the server system. The settings associated with restrictions or requirements for playback of the content are determined by the server. Once these requirements are available, the server then compares information relating to each of the various applications or rendering means with the settings associated with the content. Information relating to a suitable rendering means on the client device that meets the settings requirement of the content is encapsulated along with an identifier of such content in a token generated by the server. In one example, the content is then sent along with this token to the client device. Playback is then allowed on the client device if the player or application that has requested the content for playback is the same as a player or rendering means that is identified by the token. Accordingly, the present disclosure ensures that content with requirements such as the DRM capabilities are displayed by one or more applications or players on a client device that is specifically authorized to do so.

Accordingly, the present disclosure addresses the technical problem and drawbacks of existing systems by providing a method of customized authorization for enabling access to respective media content or playback on a client device. Thus, the disclosure includes an efficient, secure and scalable technique to confirm that any special limitations or requirements set by a content provider are met by the device or application it is being sent to for rendering. This technique can also function in a similar manner where no such requirements (relating to DRM or any other limitations) are set on the content. Thus, a present disclosure ensures that any and all media content is transmitted for playback in a secure reliable manner; ensuring authorization is applied respective to the content.

Frequently in this disclosure, examples directed to user-uploaded videos are presented. This is done for ease of explanation of some of the features described herein. However, embodiments with other content are also within the scope of this disclosure, regardless of whether specific examples of such are provided herein.

Figure 1:
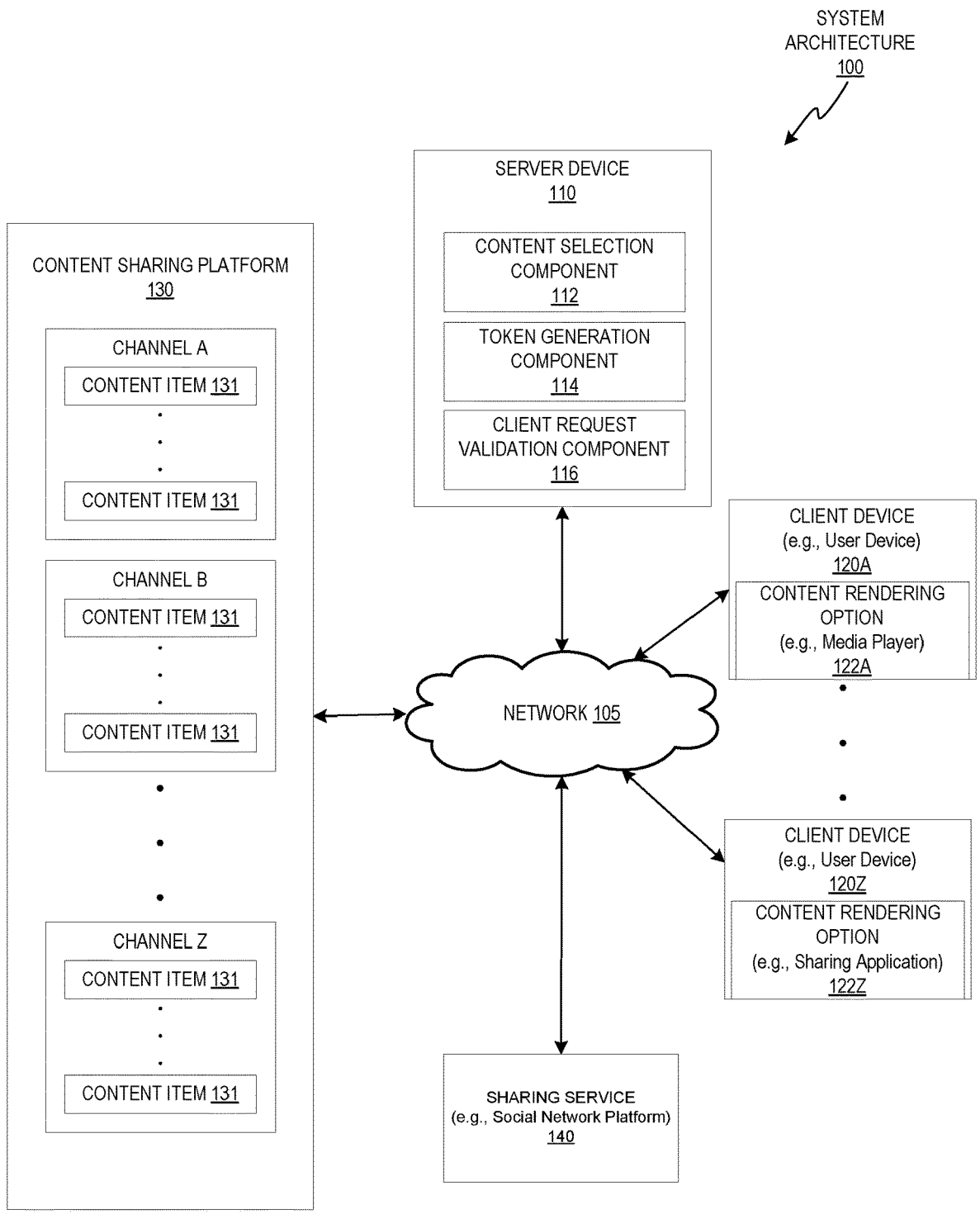
FIG. 1 illustrates an example system architecture, in accordance with an implementation of the disclosure.

FIG. 1 illustrates an example system architecture 100 for optionally restricting particular content items against unauthorized presentation or reproduction, in accordance with an implementation of the disclosure. The system architecture 100 includes a network 105, a server device 110, one or more client devices 120A-Z, a content sharing platform 130, and a sharing service 140. In one implementation, network 105 may include a public network (e.g., the Internet), a private network (e.g., a local area network (LAN) or wide area network (WAN)), a wired network (e.g., Ethernet network), a wireless network (e.g., an 802.11 network or a \Vi-Fi network), a cellular network (e.g., a Long Term Evolution (LTE) network), routers, hubs, switches, server computers, and/or a combination thereof.

Server device 110 may include one or more computing devices (e.g., a rackmount server, a server computer, etc.). In one implementation, server device 110 may be included within content sharing platform 130, sharing service 140, or other device not shown. As shown in FIG. 1, server device 110 may include a content analysis component 112, a token generation component 114, and a client request validation component 116.

Content analysis component 112 may analyze one or more content items 131 (e.g., media items) and one or more content rendering options 122A-Z (e.g., media player) and select a particular content item and a particular rendering option that satisfies one or more restriction attributes. The restriction attribute may be set by a content creator (e.g., author), a content distributor (e.g., advertiser, video host, social network), other entity associated with a content item, or a combination thereof. The restriction attribute may indicate the manner in which the content item may be presented to a user and may affect the way the content item is used, modified, reproduced, distributed, protected, controlled, processed, or combination thereof. Content analysis component 112 may analyze a restriction attribute associated with a content item and one or more rendering options available on one of the client devices 120A-Z and select a particular content item and rendering option for presentation by the client device to a user.

Token generation component 114 may analyze the selection of the content item and content rendering option and generate a token that indicates the particular content item and the particular content rendering option. The token may be received and stored by client device 120A and may be subsequently transmitted by the client before, during, or after sending a client request for the particular content item. The token and client request may be transmitted to server device 110, content sharing platform 130, sharing service 140, other service, or a combination thereof. For example, client device 120A may receive the token and data identifying a particular content item (e.g., URL) from server device 110 and may use the data to form a client request and transmit the client request and token to content sharing platform 130 to obtain the particular content item.

Client request validation component 116 may analyze information associated with the client request in view of the token to ensure that the particular content item is being presented using the particular rendering option. Client request validation component 116 may authenticate the token and may compare data of the token, which indicates the selected rendering option and the content item, with the information associated with the client request. The information associated with the client request may indicate the particular content item being requested and the corresponding rendering option. When the content item and rendering option of the client request match the content item and rendering option indicated by the token, the client request may be validated. Client request validation component 116 may then grant the client device access to the content item. For example, client request validation component 116 may indicate to content sharing platform 130 that client device 120A may proceed with presenting (e.g., local rendering) or sharing (e.g., remote rendering) of the content item.

Further description of the content analysis component 112, the token generation component 114, and the client request validation component 1 16, and their functions are described in more detail below with respect to FIG. 2.

Client devices 120A-Z may each include computing devices such as mobile phones, smart phones, tablet computers, laptops, netbook computers, personal computers (PCs), etc. In some implementations, client device 120A-Z may also be referred to as "user devices" and may be configured to receive user input from one or more users. In one example, each of the client devices 120A-Z may support one or more content rendering options 122A-Z.

Content rendering options 122A-Z may be any software component or combination of software components that are capable of rendering a content item. The rendering may involve rendering image data, audio data, video data, other content, or a combination thereof. The rendering may be local rendering that occurs on a local client device or the rendering may be remote rendering where the client device provides information (e.g., content item, or link to content item) to a remote client device for rendering. In one example, the content rendering options 122A-Z may be, or may include, a media player that is installed or executing on the local client device and is capable of playing or presenting a content item to a user. In another example, the content rendering options 122A-Z may be an application or service that interacts (e.g., shares) with one or more local or remote media players to present the content item to a user.

Content rendering options 122A-Z may include native rendering components or non-native rendering components. A native rendering component may be any rendering component that is included as part of a client device when the client device is received from the manufacturer, designer, or other entity responsible for creating or configuring the client device. A native rendering component may also be referred to as a built-in rendering component, a stock rendering component, or other similar concept. The native rendering component may be packaged with the operating system as a driver, application, or other computer program. For example, the native rendering component may be a media player that comes packaged with the operating system of a client device.

A non-native rendering component may be similar to the native rendering component but may be provided by a third party. The third party may be a device (e.g., web server) or an individual (e.g., user, IT administrator) and may provide configuration data or executable data, such as executable instructions, code, commands, or other information that may be run on the client device. The executable data may be installed or loaded onto the client device permanently or temporarily (e.g., duration of a web session or log-in session). The executable information may be added to the client device at any portion in the software stack such as a kernel driver, operating system module, application, application plugin, other software component, or a combination thereof In one example, the non-native rendering component may be included within an application (e.g., web browser) as a browser based rendering component. The browser based rendering component may be a media player that utilizes a hypertext markup language (e.g., HTML5), Adobe® Flash®, other browser based media playing technology, or a combination thereof. The non-native rendering component may be provided to the client devices 120A-Z by the server 110, content sharing platform 130, sharing service 140, other device, or a combination thereof. The browser based rendering component may present content as a standalone media player (e.g., full view) or an embedded media player (e.g., embedded in a web page).

In another example, the non-native rendering component may be an application that is installed on the client device and includes an integrated rendering component. For example, the application may be a media sharing application, such as a messaging application (e.g., instant message, text message, voice message, video message, email message), a social networking application, other media sharing application, or a combination thereof that is capable of providing a content item for presentation to the user.

Content sharing platform 130 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to content items and/or provide the content items to the user. For example, the content sharing platform 130 may allow a user to consume, upload, search for, approve ("like"), disapprove ("dislike"), and/or otherwise comment on content items. Content sharing platform 130 may also include a website (e.g., a webpage) that may be used to provide a user with access to the content items. In general, functions described in one implementation as being performed by the content sharing platform 130 can also be performed on the client devices 120A-Z in other implementations if appropriate. In addition, the functionality attributed to a particular component can be performed by different or multiple components operating together. The content sharing platform 130 can also be accessed as a service provided to other systems or devices through appropriate application programming interfaces, and thus is not limited to use in websites. In one implementation, content sharing platform 130 may store and distribute a plurality of content items 131.

Content items 131 may be any content that can be consumed or experienced by a user via client device 120A-Z. Content items 131 may include images, sound, video, text, other media, or a combination thereof. For brevity and simplicity, an online video (also hereinafter referred to as a video) is used as an example of content item 131 in this document. As used herein "content item," "content," "media," "media item," "online media item," "digital media," and "digital media item," can include an electronic data (e.g., files, records, chunks) that can be executed or loaded using software, firmware, or hardware configured to present the content item to an entity (e.g., user, viewer, listener).

Content sharing platform 130 may include multiple channels (e.g., channels A through Z). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channel s in which they are interested. Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user.

Each channel may include one or more content items 131. Examples of a content item 131 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, content item 131 is also referred to as a media item.

Sharing service 140 may include any service that is capable of sharing content item 131 with one or more other users or client devices. Sharing service 140 may provide messaging features (e.g., instant message, text message, voice message, video message, email message), social networking features (e.g., posting, commenting, news feeds, user interconnections), other media sharing features, or a combination thereof Sharing service 140 may be integrated with one or more content rendering options 122A-Z and m ay receive content items from or transmit content items to content rendering options 122A-Z. Although implementations of the disclosure are discussed in term s of content sharing platforms, implementations may also be generally applied to any type of sharing service providing connections between users.

In situations in which the systems discussed herein collect personal information about users, or may make use of personal information, the users may be provided with an opportunity to control whether the devices can collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 130.

Figure 2:
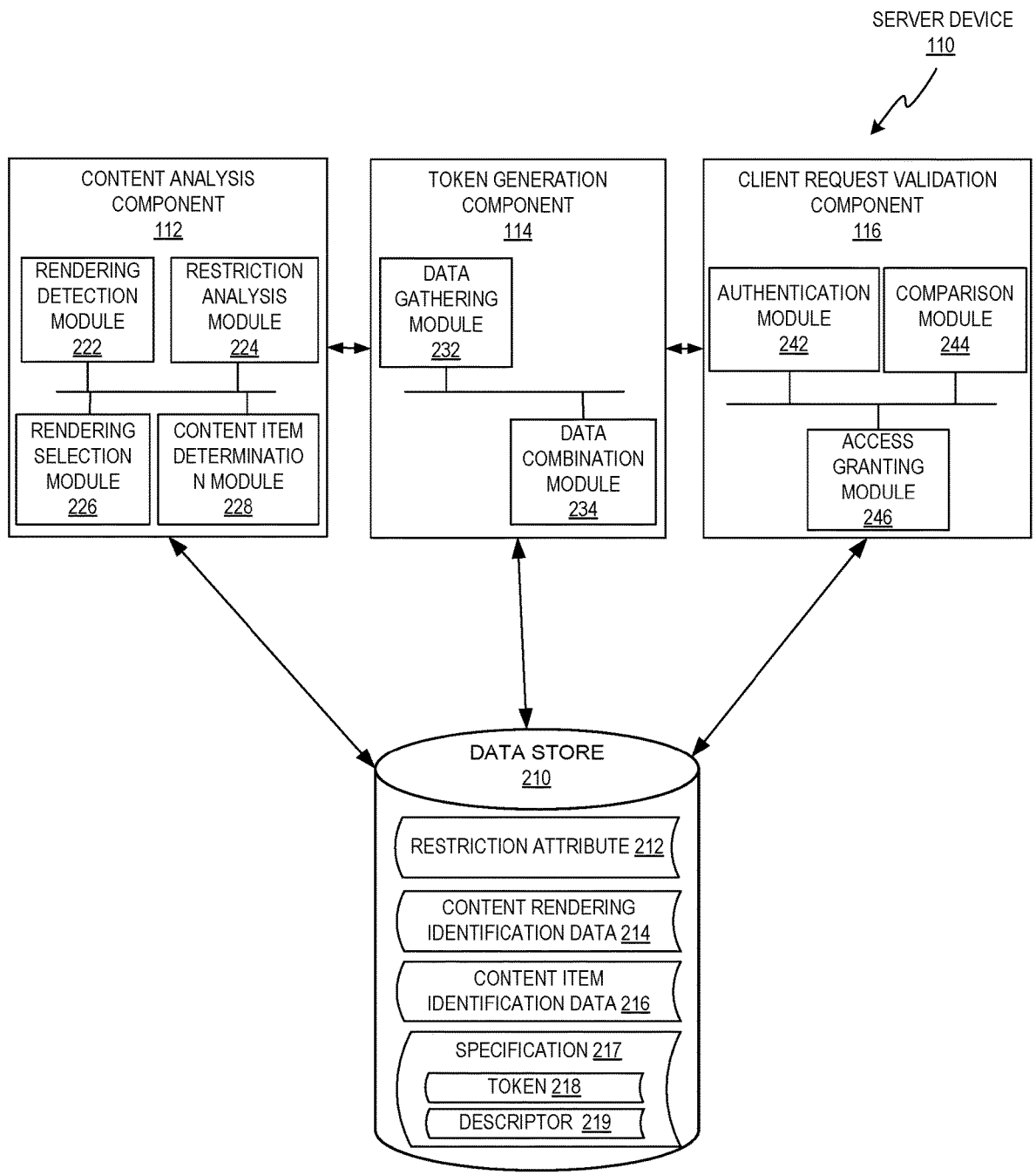
FIG. 2 is a block diagram illustrating a server device and its exemplary components and modules in accordance with one implementation of the disclosure.

FIG. 2 is a block diagram illustrating an exemplary server device 110 in accordance with one implementation of the disclosure. Server device 110 may be a part of content sharing platform, sharing service, other service, or a combination thereof. As discussed above, server device 110 may include content analysis component 112, a token generation component 114, a client request validation component 116, and a data store 210. Each of the components may include one or more modules and more or less components and/or module may be included in server device 110 without loss of generality. For example, two of the components or modules may be combined into a single component, or one of the components may be divided into two or more components. In one implementation, one or more of the components or modules may reside on different computing devices (e.g., different server devices or client devices). In one implementation, the data store 210 may be a memory (e.g., random access memory), a cache, a drive (e.g., a hard drive), a flash drive, a database system, or another type of component or device capable of storing data. The data store 210 may also include multiple storage components (e.g., multiple drives or multiple databases) that may also span multiple computing devices (e.g., multiple server computers).

Content analysis component 112 may analyze one or more content item s and one or more content rendering options and select a particular content item and a particular rendering option that satisfies one or more restriction attributes. In the example shown in FIG. 2, content analysis component 112 may include a rendering detection module 222, a restriction analysis module 224, a rendering selection module 226, and a content item determination module 228.

Rendering detection module 222 may detect a set of rendering options and the corresponding rendering components available on a client device. As discussed above, the rendering options may include different media players or different applications or services (e.g., messaging application, social network application) that interact with one or more local or remote media players. The set of rendering options available on the client device may depend on what the client device supports or what the user of the client device has indicated is available. For example, a device may support multiple rendering options but a user may indicate that one or more of the supported rendering options are not available for use or are preferred and therefore the set of available rendering options may be a subset of supported rendering options.

Rendering detection module 222 may retrieve the set of rendering options from the particular client device or from a data store that includes information that corresponds to the particular client device. In one example, rendering detection module 222 may query a particular client device for one or more rendering options supported by the client device, and the client device may respond with information corresponding to one or more rendering options. In another example, the rendering detection module 222 may access a data storage that is separate from the client device and includes information about the capabilities or configuration of the client device (e.g., the set of installed mobile applications). Rendering detection module 222 may then analyze the information to determine what rendering options are supported by the particular client device. In either example, the information corresponding to the rendering options may include information for identifying one or more native rendering components (e.g., native media player) or non-native rendering components (e.g., HTML 5 player) discussed above.

Restriction analysis module 224 may analyze one or more restriction attributes 212 associated with a content item to determine how the content item should be rendered. Restriction attribute 212 may be set by a content creator (e.g., author), a content distributor (e.g., advertiser, video host, social network), other entity associated with a content item, or a combination thereof. Restriction attribute 212 may be associated with a particular content item, a particular channel including one or more content items, a particular provider (e.g., author, distributor) of one or m ore content items, other item or entity, or a combination thereof. Restriction attribute 212 may indicate the manner in which the content item m ay be presented to a user and may affect the way the content item is used, modified, reproduced, distributed, protected, controlled, processed, or combination thereof.

Restriction attribute 212 may be any data structure for storing a setting, a flag, or other information that indicates whether a restriction scheme(s) should be used. In one example, restriction attribute 212 may be a binary element (e.g., true/false) that indicates whether a corresponding rendering option needs to support a restriction scheme. A restriction scheme may be an access control technology with rules or policies implemented in software, hardware, or a combination thereof that may be used to restrict usage of content items. The restriction scheme may restrict usage of content items by programmatically eliminating or reducing the ability of a rendering component to access, load, decode, decrypt, share, provide, present, display, or play a content item. In one example, the restriction scheme may be the same or similar to a digital rights management (DRM) scheme that control the user, modification, and distribution of proprietary or copyrighted content items.

Rendering selection module 226 and content item determination module 228 may interact with one another to select a particular rendering option and a particular content item for a client device to present to a user. In one example, the rendering selection module 226 may select a rendering option before the content item determination module 228 selects a content item. In another example, the rendering selection module 226 may select a rendering option after the content item determination module 228 selects a content item. In further examples, the rendering selection module 226 and content item determination module 228 may function in a different order.

Rendering selection module 226 may analyze one or more of the rendering options available on a client and may select a particular rendering option. The selection of a particular rendering option may be based on an evaluation of one or more rendering factors. A rendering factors may include numeric values or non-numeric values (e.g., true/false) that represent the capabilities of a rendering option. The rendering factors may be based on the restriction scheme supported (e.g., DRM, No-DRM), usability (e.g., auto playback), presentation quality (e.g., resolution, loading speed), digital container format (e.g., MP4), content codec (e.g., H.264), frame rate, bitrate, other factors, or a combination thereof.

Rendering selection module 226 may organize the set of rendering options available for the particular client device in view of one or more of the rendering factors. The organization may be based on a multiple parameter sort, a weighted sort, other sorting technique, or a combination thereof. The multiple parameter sort may sort on a first factor (e.g., restriction scheme) and then may sort on a second factor (e.g., presentation quality). The weighted sort may derive a weighted value for each rendering option (e.g., rendering technique, rendering method) and sort based on the weighted value. The weighted sort may involve identifying a weight (e.g., numeric coefficient) and a value (e.g., numeric score, alphabetical score) for each rendering factor and performing one or more mathematical operations (e.g., multiple, division, addition, subtraction) to derive a weighted value for each rendering option. Rendering selection module 226 may also filter (e.g., remove or add) one or more rendering options in view of information from restriction analysis module 224. For example, if restriction analysis module 224 indicates a restriction scheme is required, the rendering selection module 226 may remove any rendering options that do not support the restriction scheme.

Rendering selection module 226 may then select a subset of rendering option from the organized set of rendering options. In one example, rendering selection module 226 may select a single rendering option, which may be the most optimal rendering option. The most optimal rendering option may be based on the rendering option with the highest/lowest weighted value or the first/last rendering option in the organized list of rendering options. In another example, rendering selection module 226 may select multiple rendering options to include in a subset that is transmitted to the particular client device and the client device may select a rendering option from the subset.

Content item determination module 228 may access information from restriction analysis module 224 and rendering selection module 226 and may select one or more particular content items to be rendered on a client device. In one example, server 110 may receive a request for a content item and the request may not identify a particular content item. For example, a client device may submit a request for a content item (e.g., advertisement, next video) but it may not specify a particular content item. Content item determination module 228 may analyze multiple content items and may organize, sort, or filter the content items in a manner similar to that discussed in regards to rendering selection module 226. The selection of a particular content item may be based on an evaluation of one or more content selection factors. The content selection factors may be based on the restriction scheme (e.g., DRM, No-DRM), user demographics (e.g., age, gender, location), client device capability (e.g., bandwidth, screen resolution, processing power, memory), other factors or a combination thereof.

Content item determination module 228 may organize the set of content items available for the particular client device in view of one or more of the content selection factors. The organization may be based on a multiple parameter sort, a weighted sort, other sorting technique, or a combination thereof. The multiple parameter sort may sort on a primary factor (e.g., restriction scheme) and then may sort on one or more secondary factors (e.g., demographics). The weighted sort may derive a weighted value for each content item and sort based on the weighted value. The weighted sort may involve identifying a weight (e.g., numeric coefficient) and a value (e.g., numeric score, alphabetical score) for each factor and performing a mathematical operation (e.g., multiple, division, addition, subtraction) to derive a weighted value for each content item. Content item determination module 228 may also filter (e.g., remove or add) one or more content items in view of information from restriction analysis module 224 or rendering selection module 226. For example, if restriction analysis module 224 indicates there are no rendering methods that support DRM, the content item determination module 228 may remove any content items associated that a restriction attribute that require the use of DRM.

Content item determination module 228 may then select a subset of content items from the organized set of content items. In one example, content item determination module 228 may select a single content item, which may be the most optimal content item. The most optimal content item may be based on the content item with the highest/lowest weighted value or the first/last content item in the organized set (e.g., list) of content items. In another example, rendering selection module 226 may select multiple content items to include in a subset that is transmitted to the particular client device and the client device may select one or more of the content items in the subset.

In one example, server device 110 may use information determined by rendering selection module 226 and content item determination module 228 to form specification data 217. Specification data 217 may be transmitted to the client device and enable the device to present content to the user of the client device. As shown in FIG. 2, specification data 217 may include a descriptor 219 and a token 218. Both the descriptor 219 and token 218 may be generated in view of the selected rendering option. In one example, descriptor 219 may be in a format that can be interpreted by the client device and token 218 may be in a format that is not interpreted by the client device. Descriptor 219 may include content rendering identification data 214 and content item identification data 216, which are discussed in more detail below.

Token generation component 114 may generate a token 218 that corresponds to the selected rendering option and content item provided by content analysis component 112. Token 218 may be transmitted from server device 110 to a client device and may accompany a subsequent client request from the client device to the server device 110, content sharing platform, sharing service, or other service. Token 218 may be transmitted as part of or within the client request or in a separate message before, during, or after the client request is transmitted. In the example shown in FIG. 2, token generation component 114 may include a data gathering module 232 and a data combination module 234.

Data gathering module 232 may retrieve content rendering identification data 214 and content item identification data 216 from data store 210. Content rendering identification data 214 may include any information that can be used by the client or server to identify the selected rendering option(s). Content rendering identification data 214 may include a rendering identifier that can be used to identify the rendering component that implements the rendering option. In one example, the rendering identifier may identify a media player, which may be a native rendering component or a non-native rendering component. In another example, the rendering identifier may identify an application (e.g., mobile app ID) that provides support for content items and may include one or more embedded media players.

Content item identification data 216 may include any information that can be used by the client or server to identify a particular content item. Content item identification data 216 may include a content identifier that can be used to identify a particular content item. Content item identification data 216 may al so include information that defines a location or can be used to identify a location where the particular content item resides (e.g., storage device, content sharing platform, server device, client device). In one example, the content item identification data 216 may include a link such as a Uniform Resource Locator (URL) or other similar linking mechanism for locating and identifying a particular content item on a remote device. In another example, the content item identification data 216 may include a device identifier (e.g., host name) and a storage object identifier (e.g., file name).

Data combination module 234 may access content rendering identification data 214 and content item identification data 216 and combine the data to generate a token. The combination of the data may involve an encoding scheme, an encryption scheme, a hashing scheme, other scheme, or a combination thereof. In one example, the combination scheme may involve one or more encoding schemes, such as a binary-to-text encoding scheme. The binary-to-text encoding scheme may involve the encoding of data (e.g., binary data) into plain text (e.g., sequence of characters). The plain text may include American Standard Code for Information Interchange (ASCII) characters, Unicode characters, other characters, or a combination thereof. The binary-to-text encoding scheme may be a base-64 encoding scheme that transforms the content rendering identification data 214 and the content item identification data 216 into a subset of characters (e.g., radix-64 representation). The subset of characters may comprise a particular set of 64 characters (e.g., A-Z, a-z, 0-9) and may transform data 214 and 216 into a sequence of characters from the particular set. In one example, token 218 includes the sequence of characters or is represented by the sequence of characters.

Token 218 may be included within specification 217 and sent to the client device. The client device may analyze specification 217 to identify the rendering option and may forward some or all of the information within specification 217 to a rendering component associated with the rendering option. The rendering component may then generate a client request for the content item indicated by specification 217. The client request may be sent to any content serving device that has access to the content item. In one example, the client request may be sent to a content serving device that is different from server device 110. In another example, the client request may be sent to server device 110 which may fulfill the client request or forward it to a content serving device that can fulfill the client request. In either example, the client request may be analyzed by client request validation component 116 before providing the content item to the client device.

Client request validation component 116 may analyze the client request in view of the token to determine whether the rendering option and content item correspond to the rendering option and content item selected by server device 110. Client request validation component 116 may include an authentication module 242, a comparison module 244, and an access granting module 246.

Authentication module 242 may analyze the token received from the client device to verify the authenticity of the token. In one example, authentication module 242 may compare the token received from the client device to token 218 generated by the server (e.g., token 218). Token 218 may retrieved from a local or remote data store (e.g., 210). If both tokens match, the authentication module 242 may indicate that the token is authentic and has not been altered (e.g., tampered, spoofed, modified). In another example, the authentication module 242 may perform one or more mathematic operations on the token to determine whether the token is authentic. The mathematic operations may involve one or more pieces of information accessible to server device 110 (e.g., decoding function, public key, private key).

Comparison module 244 may compare the client request received from the client device with the token to validate the client request. The token used for the comparison may be the token received from the client device (e.g., within the client request) or the token generated by the server (e.g., token 218). The token received from the client and the token generated by the server may be identical to one another or may be different from one another. In one example, the token received from the client may include more or less data, and the data added or removed may include timing data, version data, source/destination data, other data, or a combination thereof Comparison module 244 may interpret data from the client request and the token and compare the interpreted data. The client request may provide data that identifies a particular content item and data that identifies the rendering option. For example, the client request may include data that identifies a media player that originated the client request and a URL or portion of a URL that identifies the location or name of a particular content item. This information may be extracted from the client request and made accessible to server device 110 for subsequent processing. As discussed above, the token may include a combination of content rendering identification data 214 and content item identification data 216. Although, data 214 and 216 may be combined (e.g., encoded, encrypted) in a manner that may be uninterpretable by the client device it may be subsequently interpreted by server device 110. Server device may extract (e.g., decoded, decrypted) data 214 and 216 from the token. Comparison module 244 may then compare the data interpreted from the client request with the data interpreted from the token to identify any similarities and/or differences.

Access granting module 246 may analyze the results of the comparison between the data of the client request and the data of the token and determine whether to grant the client device access to the requested content item. In one example, access granting module 246 may determine whether the data of the token and the data of the client request match. If they do not match, that may indicate that either the content item or rendering option of the client request does not correspond to the selection of the server and the client request may not proceed. If they match, that may indicate that the particular content item and rendering option selected by server device 110 is being requested by the client device and the client request may proceed.

Access granting module 246 may enable the client request to proceed by validating the client request. The validation may be in the form of a signal that acknowledges that the client request conforms with the token and that the content item can be provided to the client device that transmitted the client request. The signal may be sent to another component on server device 110 or may be sent over a network to another device that is responsible for providing the content item to the client device, such as a content providing server (e.g., content streaming server of the content sharing platform).

Figure 3:
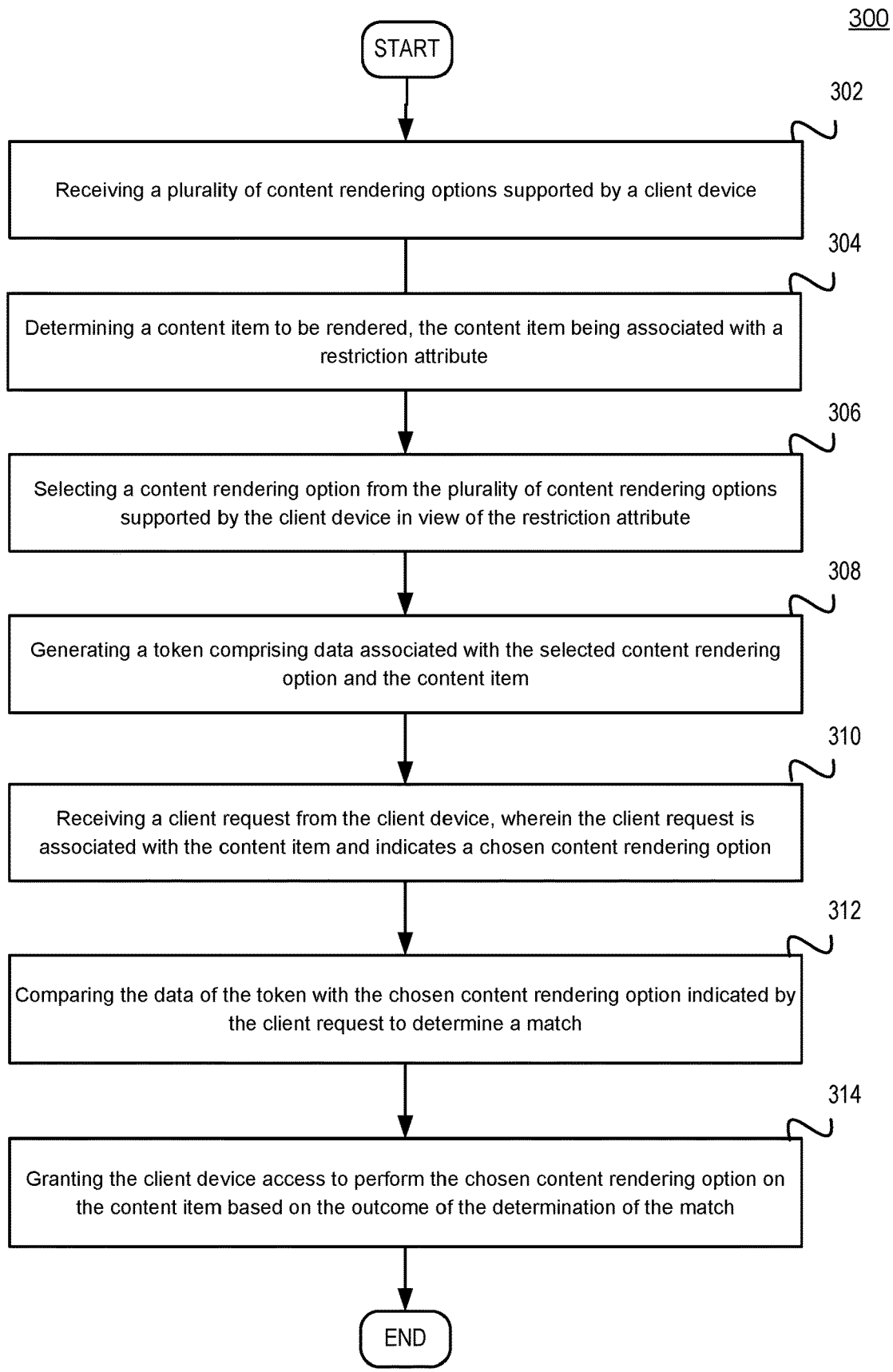
FIG. 3 is a flow diagram illustrating an example of an attribution indexing method in accordance with some implementations of the disclosure.

FIG. 3 depicts a flow diagram for an illustrative example of method for optionally restricting a content item. Method 300 may be performed by processing devices that may comprise hardware (e.g., circuitry, dedicated logic, programmable logic, microcode, etc.), software (such as is run on a general purpose computer system or a dedicated machine), or a combination of both. Method 300 and each of its individual functions, routines, subroutines, or operations may be performed by one or more processors of a computing device executing the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by server device 110 as shown in FIGS. 1 and 2.

Referring to FIG. 3, method 300 may be performed by processing devices of a server device or a client device and may begin at block 302. At block 302, a processing device may receive a plurality of content rendering options supported by a client device. The plurality of rendering options received may indicate the rendering options supported by the client device. In one example, the method may involve the processing device querying the device for content rendering options that are supported by the device and receiving the plurality of content rendering options from the device. In another example, the processing device may receive the rendering options with a client request without querying the client device.

At block 304, the processing device may determine a content item to be rendered, the content item being associated with a restriction attribute. In one example, determining the content item may involve identifying a content item in view of a content identifier received from the client device. In another example, determining the content item may involve selecting the content item from a plurality of content items after filtering out one or more content items that are not supported by at least one of the plurality of content rendering options of the client device. In other examples, the determination of the content item may be based on an organization of the one or more content items. The organization may be based on a multiple parameter sort, a weighted sort, other sorting technique, or a combination thereof. The multiple parameter sort may sort on a first factor (e.g., restriction scheme) and then may sort on a second factor (e.g., presentation quality). The weighted sort may derive a weighted value for each rendering method and sort based on the weighted value. The weighted sort may involve identifying a weight (e.g., numeric coefficient) and a value (e.g., numeri c score, alphabetical score) for each factor and performing an arithmetic operation (e.g., multiple, division, addition, subtraction) to derive a weighted value for each rendering option. The processing device may also filter (e.g., remove or add) one or more rendering options. The processing device may then select a subset of rendering options from the organized set of rendering options. In one example, processing device may select a single rendering option, which may be the most optimal rendering option. The most optimal rendering option may be based on the rendering option with the highest/lowest weighted value or the first/last rendering option in the organized list of rendering options.

At block 306, the processing device may select a content rendering option from the plurality of content rendering options supported by the client device in view of a restriction attribute. The restriction attribute may be associated with the content item and may be provided by a creator or distributor of the content item. In one example, the restriction attribute may indicate whether the content item corresponds to a rendering option that supports digital rights management (DRM) or a rendering option that is free of DRM (e.g., without DRM).

The selection of the rendering option may comprise identifying the rendering option from the plurality of rendering options based on a user experience of the rendering option. The user experience may be determined in view of an analysis and evaluation of one or more rendering factors. The rendering factors may be numeric values or non-numeri c values (e.g., true/false) that represent the capabilities of a rendering option. The rendering factors may be based on the restriction scheme (e.g., DRM, No-DRM), usability (e.g., auto playback), presentation quality (e.g., resolution, loading speed), digital container format (e.g., MP4), content codec (e.g., H.264), frame rate, bitrate, other factors or a combination thereof. The numeric values and/or non-numeric values may be scored and weighted to produce a rendering score. The rendering score may be compared to a predetermined threshold to select or eliminate one or more of the rendering options. For example, the predetermined threshold may be a minimum threshold value and rendering options with scores below the minimum threshold value may be eliminated as available rendering options and rendering options with scores above the minimum threshold value may be available to be the selected rendering option.

At block 308, the processing device may generate a token that includes data associated with the selected rendering option and the content item. Generating the token may involve encoding the data associated with the rendering option and the selected content item using a binary-to-text function. The generated token may then be transmitted to the client device as part of or in addition to a specification. In one example, the processing device may transmit the token and the specification to the client device prior to receiving the client request. The specification may indicate the selected content item and the selected rendering option to the client device. The generated token may be added (e.g., concatenated) to the descriptor (e.g., URL) prior to being transmitted to the client device.

At block 310, the processing device may receive a client request from the client device, wherein the client request is associated with the content item and indicates a chosen content rendering option. The client request may be generated by the client device in view of user input and/or input received by the processing device (e.g., specification, descriptor). In one example, a user may provide user input identifying a primary content item (e.g., user generated video) and the processing device may identify a secondary content item (e.g., advertisement) and transmit a specification identifying the secondary content item. The client device may then generate a client request for the second content item in view of the specification.

At block 312, the processing device may compare the data of the token with the chosen rendering option indicated by the client request to determine a match. The processing device may derive data from the token by performing a data extraction, decoding, decryption or other similar function. The token may include an identifier of the determined content item and an identifier of the selected rendering option. The identifier of the rendering option may correspond to a particular rendering component (e.g., media player, sharing application) on the client device that performs the rendering option. In one example, the processing device may authenticate the token received from the client device and then validate the client request received from the device in view of the token received from the client device.

At block 314, the processing device may grant the client device access to perform the chosen content rendering option on the content item based on the outcome of the determination of the match. Granting the client device access to the content item may comprise providing the content item to a rendering component on the client device that implements the selected rendering option. The rendering component may be at least one of a native media player, a browser media player, or a plugin media player. Responsive to completing the operations described herein above with references to block 314, the method may terminate.

As discussed throughout the specification, method 300 may be implemented with rendering options that are media players or may be implemented with rendering options that are based on applications or services that interact with local or remote media players. In the latter implementation, the rendering options may be associated with a sharing service that provides remote rendering on another client device. The details of the rendering options may be stored on the server device and may not need to be retrieved from the client device at run time. Each of the remote rendering options (e.g., sharing options) may be determined in view of descriptors corresponding to each of the multiple applications available on the client device for sharing to a service (e.g., social networking service, messaging service). Each of the descriptors may be associated with rendering factors (e.g., DRM capability) and when a client device receives user input initiating a remote rendering request the client device may report it to the server device.

The server device may have access to a set of applications that the user has installed that can fulfill a remote rendering request (e.g., share request). For each of the rendering options the server may consult a device configuration on the server to determine the available rendering options. Typically, the rendering options will be listed in an optimal order based on the best user experience, and then filtered similarly to the description above. However, in some applications the sharing user may have control over which rendering options are available. For example, the user may select an option to explicitly render a video clip as a GIF instead of as a link. In this case, this user defined decision is passed to the server device as part of the remote rendering request, and the service responds with only a subset of the services that the client supports (the subset that can handle the DRM free sharing methods). In another application the both DRM and non-DRM sharing methods may be included in the same list of sharing services.

Once the server determines the list of appropriate rendering options they may be transmitted to the client device, which may initiate one of the remote rendering options. In the case that the client device selects a remote rendering option that is non-DRM the content may include a reference to a content item (as opposed to the actual content item). The receiving client device may then access (e.g., download, stream) this content and render it using the selected rendering option.

Figure 4:
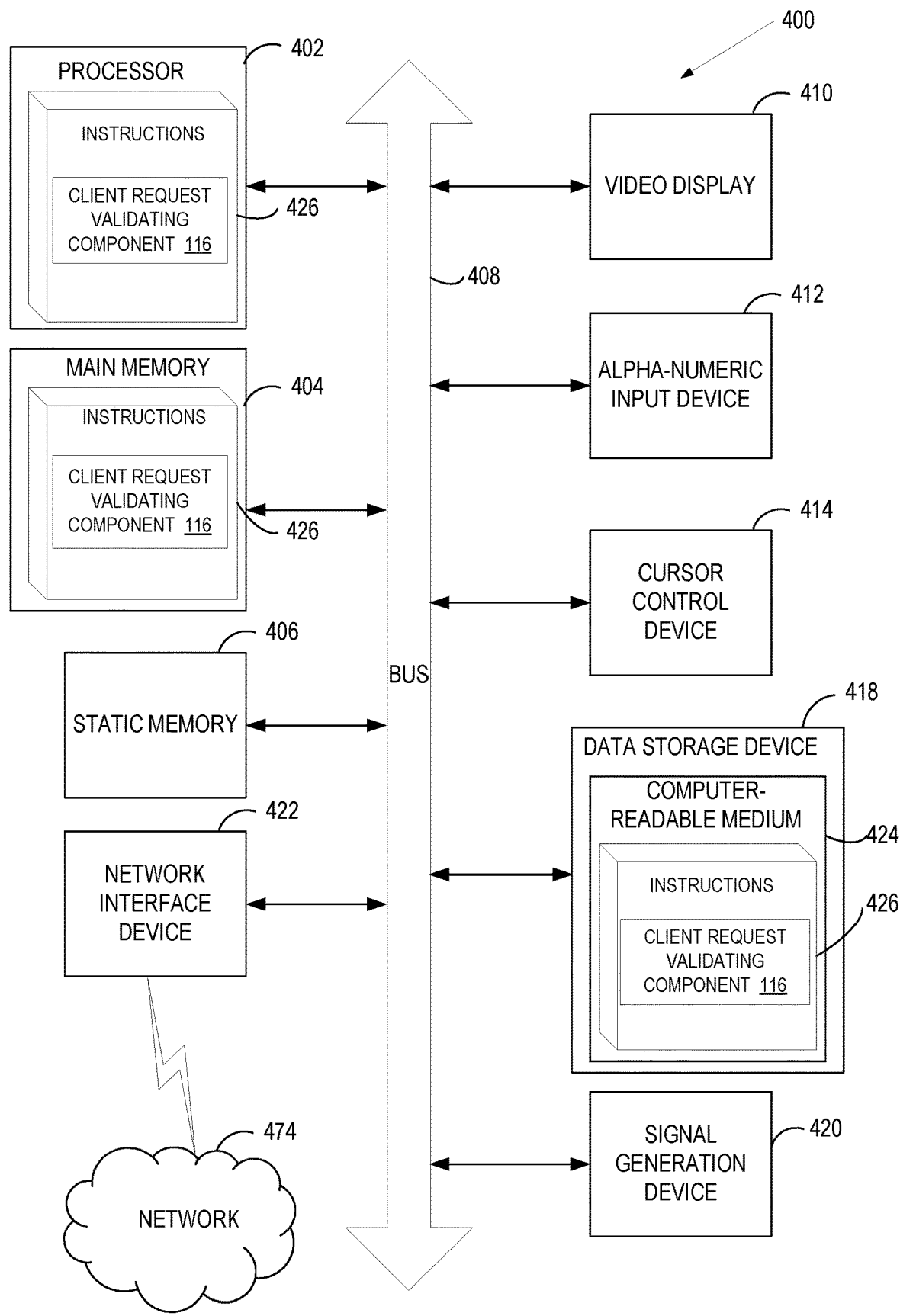
FIG. 4 is a block diagram illustrating an example system architecture, according to some implementations of the disclosure.

FIG. 4 illustrates a diagrammatic representation of a machine in the exemplary form of a computer system 400 within which a set of instructions or sets of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC a set-top box (STB), a Personal Digital Assistant (PDA), a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or m ore of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 408.

Processor 402 represents one or more general-purpose processing devices such as a microprocessor, central processing unit, or the like, having one or more cores. Before particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein. For example, the processor 402 may execute instructions 426 to perform method 300 as shown herein in FIG. 3.

The computer system 400 may further include a network interface device 422. The computer system 400 also may include a video display 410 (e.g., a liquid crystal display (LCD), a cathode ray tube (CRT), or a touch screen), an alphanumeric input device 412 (e.g., a physical keyboard or a virtual keyboard), a cursor control device 414 (e.g., a mouse), and a signal generation device 420 (e.g., a speaker).

The data storage device 418 may include a non-transitory computer-readable storage medium 424 on which is stored one or more sets of instructions 426 (e.g., software) embodying any one or more of the methodologies or functions described herein. The instructions 426 may also reside, completely or at least partially, within the main memory 404 and/or within the processor 402 during execution thereof by the computer system 400, the main memory 404 and the processor 402 also constituting computer-readable storage media. The instructions 426 may further be transmitted or received over a network 474 via the network interface device 422.

In one embodiment, the instructions 426 include instructions for providing client request validation component 116 or other features which m ay correspond, respectively, to identically-named counterparts described with respect to FIG. 1 and/or a software library containing methods for displaying content in between loops of a looping content item. While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signal s as bits, values, elements, symbol s, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "identifying", "generating", "comparing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to a system for performing the operations herein. This system may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Reference throughout this specification to "one embodiment" or "an embodiment" means that a particular feature, structure, or characteristic described in connection with the embodiment is included in at least one embodiment. Thus, the appearances of the phrase "in some embodiments" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. If any other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
receiving, by a processing device associated with a source of content items, a plurality of content rendering options supported by a client device, wherein each content rendering option comprises a software component or combination of software components that are capable of rendering content items;
determining, by the processing device, a content item to be rendered, the content item being associated with a restriction attribute;
selecting, by the processing device, a content rendering option from the plurality of content rendering options supported by the client device in view of the restriction attribute;
generating, by the processing device, a first token comprising data identifying the selected content rendering option and the content item;
storing, by the processing device, the first token;
receiving, by the processing device from the client device, a client request including a second token, wherein the client request is associated with the content item and indicates a particular content rendering option chosen by the client device;
comparing, by the processing device, the data of the first token with the particular content rendering option indicated by the client request to determine that the selected content rendering option identified by the data is the same as the particular rendering option chosen by the client device;
comparing, by the processing device, the first token stored by the processing device and the second token received from the client device to determine that the first token and the second token match; and
granting, by the processing device, the client device access to perform the particular content rendering option on the content item based on the determination that the selected content rendering option identified by the data is the same as the particular rendering option chosen by the client device and the determination that the first token and the second token match.

2. The method of claim 1, wherein the restriction attribute associated with the content item is provided by a creator of the content item.

3. The method of claim 1, wherein the restriction attribute indicates whether the content item corresponds to a content rendering option that supports digital rights management (DRM) or a rendering option that is free of DRM.

4. The method of claim 1, wherein generating the first token comprises encoding the data associated with the selected content rendering option and the content item using a binary-to-text function.

5. The method of claim 1, wherein the selected content rendering option corresponds to a particular media player on the client device that can perform the selected content rendering option.

6. The method of claim 1, wherein the selected content rendering option corresponds to a sharing application on the client device.

7. The method of claim 1, comprising:
transmitting the first token to the client device; and
subsequently receiving the second token with the client request.

8. The method of claim 7, comprising:
authenticating the second token received from the client device; and
validating the client request in view of the second token received from the client device.

9. The method of claim 1, further comprising:
transmitting the first token and a specification to the client device prior to receiving the client request, the specification indicating the content item and the selected content rendering option to the client device.

10. The method of claim 1, wherein determining the content item comprises identifying the content item in view of a content identifier received from the client device.

11. The method of claim 1, wherein determining the content item comprises selecting the content item from a plurality of content items after filtering out one or more content items that are not supported by at least one of the plurality of content rendering options of the client device.

12. The method of claim 1, wherein selecting the content rendering option comprises identifying the content rendering option from the plurality of content rendering options based on a user experience of the content rendering option exceeding a predetermined threshold.

13. The method of claim 1, wherein granting the client device access comprises providing the content item to a rendering component on the client device that implements the selected content rendering option, wherein the rendering component is at least one of a native media player, a browser media player, or a plugin media player.

14. The method of claim 1, further comprising:
querying the client device for the content rendering options supported by the client device; and
receiving the plurality of content rendering options from the client device.

15. The method of claim 1, wherein the selected content rendering option comprises playback or display of the content item.

16. The method of claim 1, wherein the selected content rendering option comprises remotely rendering the content item using one or more sharing services available to the client device.

17. A system comprising:
a processing device; and
a memory communicably coupled to the processing device, the memory comprising instructions that, when executed by the processing device, cause the processing device to:
receive a plurality of content rendering options supported by a client device, wherein each content rendering option comprises a software component or combination of software components that are capable of rendering content items;
determine a content item to be rendered, the content item being associated with a restriction attribute;
select a content rendering option from the plurality of content rendering options supported by the client device in view of the restriction attribute;
generate a first token comprising data identifying the selected content rendering option and the content item;
store the first token;
receive, from the client device, a client request including a second token, wherein the client request is associated with the content item and indicates a particular content rendering option chosen by the client device;

compare the data of the first token with the particular content rendering option indicated by the client request to determine that the selected content rendering option identified by the data is the same as the particular rendering option chosen by the client device;

compare the first token stored by the processing device and the second token received from the client device to determine that the first token and the second token match; and grant the client device access to perform the particular content rendering option on the content item based on the determination that the selected content rendering option identified by the data is the same as the particular rendering option chosen by the client device and the determination that the first token and the second token match.

18. The system of claim 17, wherein the restriction attribute associated with the content item is provided by a creator of the content item.

19. A non-transitory computer-readable storage medium comprising instructions that, when executed by a processing device, cause the processing device to:

receive a plurality of content rendering options supported by a client device, wherein each content rendering option comprises a software component or combination of software components that are capable of rendering content items;

determine a content item to be rendered, the content item being associated with a restriction attribute;

select a content rendering option from the plurality of content rendering options supported by the client device in view of the restriction attribute;

generate a first token comprising data identifying the selected content rendering option and the content item;

store the first token;

receive, from the client device, a client request including a second token, wherein the client request is associated with the content item and indicates a particular content rendering option chosen by the client device;

compare the data of the first token with the particular content rendering option indicated by the client request to determine that the selected content rendering option identified by the data is the same as the particular rendering option chosen by the client device;

compare the first token stored by the processing device and the second token received from the client device to determine that the first token and the second token match; and grant the client device access to perform the particular content rendering option on the content item based on the determination that the selected content rendering option identified by the data is the same as the particular rendering option chosen by the client device and the determination that the first token and the second token match.

20. The non-transitory computer-readable storage medium of claim 19, wherein the restriction attribute associated with the content item is provided by a creator of the content item.

* * * * *